United States Patent Office 3,105,504
Patented Oct. 1, 1963

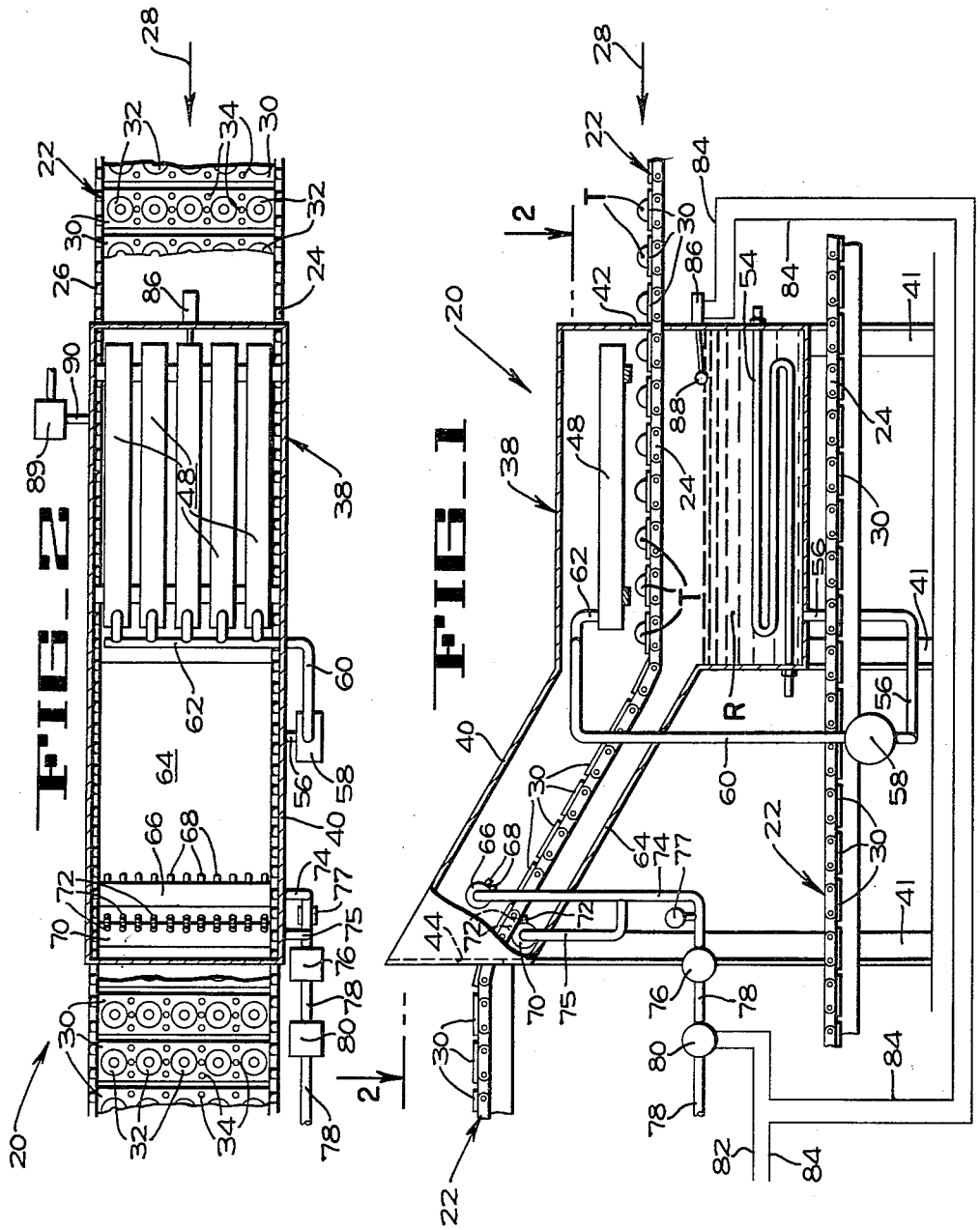

3,105,504
APPARATUS FOR PROCESSING FRUIT
Katsuji Hirahara, San Jose, Calif., assignor to FMC Corporation, a corporation of Delaware
Filed May 23, 1960, Ser. No. 31,047
1 Claim. (Cl. 134—57)

The present invention pertains to a fruit processing apparatus and more particularly to an apparatus for applying a caustic solution to fruit processed therein.

Fruit processing machines often employ baths or showers for applying a processing solution to fruit. For example, a caustic solution such as lye is commonly used in tomato processing machines and is applied to the tomatoes in order to loosen their skins prior to a peeling operation. The caustic solution frees the skin from the fruit flesh and assures easy separation of the skin from the flesh without the need of paring the fruit.

In one form of tomato processing machine, the caustic solution is heated and is showered upon the tomatoes from troughs mounted over a fruit conveyor. This heated solution is applied to the tomatoes in a substantially closed tank in order to prevent, as much as is possible, evaporation loss of the heated vapors. However, because of the difficulty in effecting a seal between the moving tomato conveyor and the tank in which the heated solution is applied, a large amount of the processing solution vapors are lost, causing the concentration of the lye bath to increase. At the same time, the lye solution remaining on the tomatoes and on the flights carrying the tomatoes will cause a rapid depletion of the lye solution if the solution is retained on the tomatoes and flights as they are moved out of the tank.

Accordingly, one of the objects of the present invention is to provide improvements in reconstituting a processing solution in order to compensate for the evaporative loss of water vapors while simultaneously reclaiming that portion of the solution carried on the fruit and the fruit conveyor.

Another object is to provide improved and simplified apparatus for applying a processing solution, and simultaneously compensating for the evaporative loss of water vapors from the bath.

These objects, as well as other objects and advantages of the present invention, will become apparent from the following description and the accompanying drawing, in which:

FIGURE 1 is a schematic elevation, partly broken away, of a portion of a tomato processing machine incorporating the present invention.

FIGURE 2 is a schematic horizontal section taken substantially on lines 2—2 of FIGURE 1 and having a portion of a fruit conveyor flight therein broken away.

The illustrated portion of a tomato processing machine 20 (FIGS. 1 and 2) in which the present invention is used, includes an endless chain conveyor 22 having spaced roller chains 24 and 26 which are driven, by drive means not shown, to continuously advance the upper flight of the conveyor in the direction of the arrow 28. An endless series of transverse fruit conveying flights 30 are fixed to the chains 24 and 26, and each flight has a plurality of centrally apertured fruit receiving pockets 32 therein and draining apertures 34 between the pockets 32.

The top flight of the fruit conveyor 22 passes through the upper portion of a lye tank 38 and inclines upwardly through a draining section 40 of the tank, said tank being supported on legs 41. The tank 38 is provided with an inlet aperture 42 and an outlet aperture 44, respectively, for the conveyor 22, and a plurality of longitudinally extending lye troughs 48 are mounted in the tank 38 above the upper flight of the conveyor. As tomatoes T are carried in the pockets 32 beneath the troughs 48 by the flights 30, a continuous shower of lye solution is caused to overflow the longitudinal side edges of the lye troughs and cascades down on the tomatoes in order to thoroughly wet the tomatoes with the caustic solution. This solution remains on the tomatoes until they are near the outlet aperture 44 so that their skins are penetrated by the lye and loosened from the flesh of the fruit for subsequent peeling.

The lye solution overflowing the troughs 48 is supplied from a pool, or reservoir R of lye solution which occupies the lower portion of the lye tank 38. A steam coil 54 is mounted in the bottom portion of the lye tank and is connected to a steam source, not shown, in order to heat the lye solution and thus accelerate its caustic action. In addition to lye, the solution contains a wetting agent which assures that the lye shower impinging the tomatoes T will completely wet the skins of the fruit.

A conduit 56, mounted in the bottom panel of the lye tank 38 and communicating with the interior of the tank, transfers liquid from the pool R to a motor driven pump 58. From the pump 58 the heated lye solution is pumped into a conduit 60 which is connected to a transversely extending manifold 62 that is mounted adjacent one end of the lye troughs 48 and communicates with each trough. The heated lye solution enters the troughs and overflows the longitudinal edges of the lye troughs to shower upon the tomatoes carried by the fruit conveyor 22.

After the tomatoes have been wetted by the lye solution overflowing the lye troughs 48, the tomatoes T advance upwardly through the draining section 40. During this advance, the greater portion of the lye solution drains from the tomatoes and the flights 30 and passes through the apertured fruit pockets 32 and the drain holes 34 provided in the flights. The draining lye solution falls upon an inclined bottom panel 64 of the draining tank 40 and gravitates back to the pool R of liquid.

At the same time that the tomatoes T are being thus processed by the caustic bath, the heated vapors of the bath are escaping from the tank 38 by means of the inlet and outlet apertures 42 and 44, respectively. This vapor loss, plus the loss of the lye solution remaining on the tomatoes and flights leaving the draining tank 40, normally causes a rapid depletion of the lye solution. In the present invention a cold water spray is used to reclaim that portion of the lye solution which is carried by the fruit and the fruit flights 30, in a manner which also restores the water vapors lost by evaporation from the lye reservoir R.

A tubular manifold 66 is mounted across the drain tank section 40 over the upper flight of the conveyor 22 at a point adjacent the outlet aperture 44. A plurality of spray nozzles 68 are provided on the manifold 66 whereby when the manifold contains water under pressure, spray jets issue from the nozzles and impinge upon the tomatoes T and flights 30 to wash away the lye solution they carry. A similar manifold 70 is mounted in the tank section 40 downstream of the nozzles 68 and is provided with a plurality of spray nozzles 72 which rinse lye from the underside of the conveyor 22. In this manner substantially all of the lye solution on the fruit and on the conveyor is rinsed away to fall upon the inclined panel 64 and be returned to the reservoir of lye solution R.

Cold water at a constant pressure is supplied to the spray nozzles 68 and 72 by means of conduits 74 and 75, respectively, which are connected to a combined pressure regulator and flow control valve 76. In this way a constant volume of cold water is discharged from the nozzles 68 and 72 and the flow can be accurately determined by means of a pressure gauge 77 which is mounted on the conduit 74. Water is conducted to the pressure regulator 76 by a conduit 78 that is connected to a source of water under pressure, and the flow in the conduit 78 is controlled by a solenoid operated, normally open valve 80.

The solenoid of valve 80 is energized by electrical power supplied thereto by conductors 82 and 84. In series with the electrical wire 84 is a float controlled switch 86 that is mounted on the outside of the lye tank 38 and has a float member 88 disposed within the tank to sense the level of the lye solution in the reservoir R. When the float member 88 is raised by the solution in the tank 38, the contacts of switch 86 close in order to energize the solenoid valve 80 and shut off the flow of water. The switch 86, and the solenoid valve 80 which it operates, together provide a safety device to assure that the liquid level in the tank 38 does not rise above the desired level. In other words, if the spray heads 68 and 72 should supply more water than is needed to compensate for the evaporative loss of the solution, the spray heads 68 and 72 will not operate until the liquid level in the tank 38 drops. This precaution is necessary because the evaporative loss differs according to the ambient air temperature, that is, the constant volume of water supplied by the spray heads 68 and 72 might at one time of the day be too much.

At this point it should be explained that an automatic density control 89 (FIG. 2) provides a constant sampling of a part of the lye solution in the reservoir R. If the concentration of the solution falls below a certain limit, the density control admits a highly concentrated aqueous lye solution to the reservoir by means of an inlet pipe 90 until the required density, or concentration, of lye is reached. The density control 89 has been long known and used with processing solutions and its details of construction form no part of the present invention. However its use with means for replenishing the solution, so that whatever the volume of water added by the spray nozzles 68 and 72, the density of the solution remains substantially the same, is considered to be an important aspect of the present invention since it is necessary to maintain the concentration of the solution at a desired level at all times.

In practicing the present invention in the embodiment herein disclosed, the combined pressure regulator and flow valve unit 76 is adjusted to deliver water to the spray nozzles 68 and 72 at a pressure wherein the spray nozzles discharge a total volume of water which slightly exceeds the highest evaporative loss from the tanks 38 and 40. For example, if the evaporative loss of the heated lye vapors is determined to vary from 30 gallons per hour at the start of a processing operation, to a maximum of 40 gallons per hour later in the day, the volume of water discharged by the nozzles 68 and 72 should be adjusted, by means of the pressure regulator 76, to slightly exceed the 40 gallon loss. Ideally, this spray volume should total about 41 gallons per hour.

In actual practice it is found that the evaporative loss from the lye tank does not follow a uniform scale, but increases rapidly as the processing run of the machine progresses. The reason for this is that the processing begins in the cool of the morning and the evaporation loss is least when the ambient air temperature is lowest, but the air temperature rises quickly. Other factors are of course involved, but generally speaking, the evaporation loss increases rapidly in the normal course of a processing run. If the actual evaporative loss at some time during a processing operation is 30 gallons per hour, there will accordingly be a net gain of liquid volume in the pool R of about 11 gallons per hour since the spray nozzles 68 and 72 are discharging at the rate of 41 gallons per hour. This net gain will continue until the level control switch 86 shuts off the sprays. The overall gain in liquid volume, because the inlet pipe 90 during this time is admitting the concentrated lye solution to the reservoir of liquid in order to compensate for the dilution caused by the sprays, is actually slightly more than the 11 gallons per hour added by the water sprays. This is assuming that a processing run of the tomato machine 20 is begun with a liquid level of lye in the pool R less than is sufficient to contact the float arm 88. The solenoid operated valve 80 will accordingly be open and the water spray nozzles 68 and 72 will be operating from the beginning of the operation.

In any case, when the spray nozzles 68 and 72 are operating, the lye solution which would be otherwise carried away on the tomatoes T and the conveyor flights 30 is rinsed off the flights and tomatoes to be diverted back to the reservoir R. At the same time, the water used for rinsing is making up for the loss of the heated lye vapors escaping through the inlet and outlet apertures 42 and 44, respectively.

It will be apparent that the most desirable condition obtainable would be to have the water discharged from the spray nozzles precisely compensate for the evaporative loss of the heated lye bath. The requirements for obtaining this condition however, vary from one location to another and include so many variable factors that one installation cannot meet the requirements of another. I have found however, that by adjusting the volume of water from the spray nozzles to slightly exceed the highest evaporative loss, as experimentally determined in a processing operation without using the spray nozzles, that the savings in lye which was heretofore lost is considerable. In actual production runs of a tomato machine employing the apparatus of the present invention, savings in the lye have been as high as from 3 to 5 pounds of 100% lye per hour, a substantial contribution toward reducing the processing cost of the fruit. It will accordingly be apparent that the present invention is of great commercial value and despite its extreme simplicity, constitutes a noteworthy advance in the art.

While a particular embodiment of the present invention has been shown and described it will be understood that the apparatus is capable of modification and variation without departing from the principles of the invention and that the scope and proper interpretation of the claim appended hereto.

The invention having thus been described, what is claimed and desired to be protected by Letters Patent is:

In a fruit processing machine the combination of a processing tank defining a fluid reservoir adapted to contain a caustic fluid, fluid discharge means mounted over said reservoir, a fruit conveyor positioned and movable between said reservoir and said fluid discharge means, said conveyor having upper and lower surfaces respectively facing said discharge means and said reservoir, means for transferring a caustic fluid from said reservoir to said fluid discharge means for showering fluid from said resevoir onto the fruit carried by said conveyor, a spray mounted adjacent to said conveyor in spaced relation to said reservoir for directing water onto the fruit and onto said fruit conveyor to rinse away the caustic fluid showered thereon by said fluid discharge means, control means for sensing the depletion of caustic fluid from said reservoir and for controlling the flow of said spray, means for collecting and returning to said reservoir the water discharged from said spray and the caustic fluid rinsed from the fruit and said fruit conveyor so as to make-up the evaporative loss of fluid from said reservoir, and density control means communicating with said reservoir for adding a concentrated caustic solution to said reservoir to maintain the concentration of the caustic fluid in said reservoir at a predetermined level as rinse water and caustic fluid is directed into the reservoir and caustic fluid is evaporated therefrom.

References Cited in the file of this patent
UNITED STATES PATENTS

| | | |
|---|---|---|
| 1,576,001 | Olden | Mar. 9, 1926 |
| 1,916,269 | Kingsbury | July 4, 1933 |
| 1,932,827 | Morris | Oct. 31, 1933 |
| 2,499,454 | Bowman | Mar. 7, 1950 |
| 2,538,200 | Johnston | Jan. 16, 1951 |
| 2,666,711 | Crosset | Jan. 19, 1954 |
| 2,745,419 | Slingerland | May 15, 1956 |